No. 798,039. PATENTED AUG. 22, 1905.
A. S. HUBBARD.
APPARATUS FOR ELECTRICAL REGULATION.
APPLICATION FILED FEB. 25, 1905.
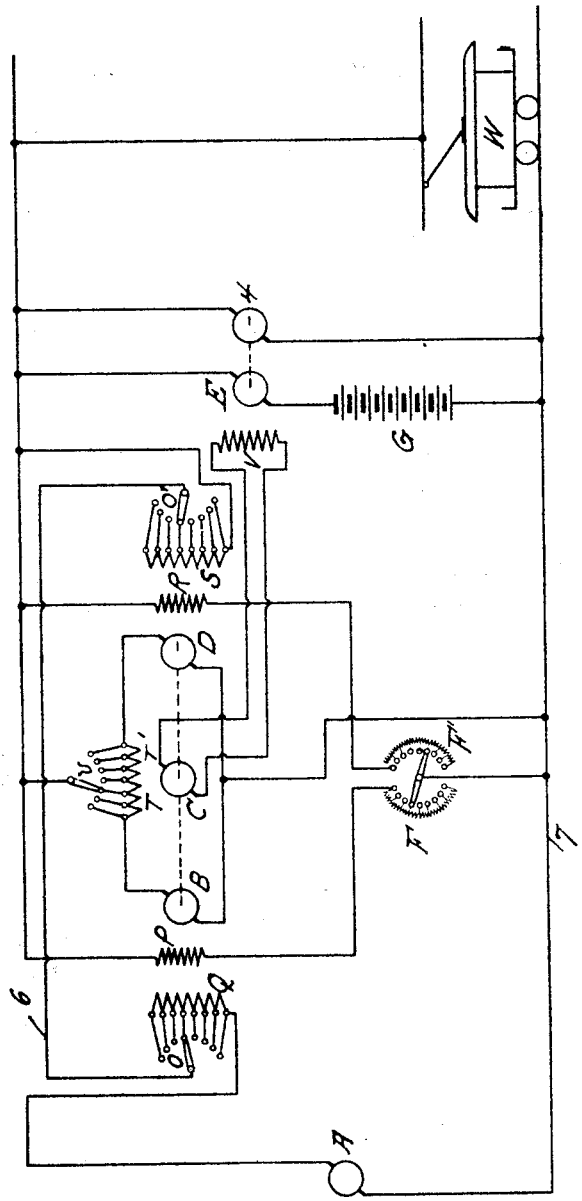
Witnesses
John O. Gempler.
Geo. M. Harris.
Inventor
A. S. Hubbard
By his Attorneys
Kenyon & Kenyon

UNITED STATES PATENT OFFICE.

ALBERT S. HUBBARD, OF GREENWICH, CONNECTICUT.

APPARATUS FOR ELECTRICAL REGULATION.

No. 798,039.　　　　Specification of Letters Patent.　　　　Patented Aug. 22, 1905.

Application filed February 25, 1905. Serial No. 247,237.

*To all whom it may concern:*

Be it known that I, ALBERT S. HUBBARD, a citizen of the United States, residing in Greenwich, in the county of Fairfield and State of Connecticut, have invented a new and useful Apparatus for Electrical Regulation, of which the following is a specification.

My invention relates to the automatic regulation of electrical circuits.

In an application filed by me June 17, 1904, Serial No. 212,936, I show a system of distribution in which a dynamo is automatically regulated by means of a novel arrangement and combination of apparatus. My present invention embodies the principles of the invention of my earlier patent and is an embodiment of the broad invention of said application, but differs therefrom in certain important respects to be hereinafter set out. In the present application I propose only to claim the specific features of the regulating apparatus not shown or claimed in the prior application. For some conditions I prefer the specific combination and arrangement of the present application, while for other conditions the specific combination and arrangement of my prior application may be preferable.

I have specifically shown my invention in connection with a system of distribution employing a main generator, a storage battery, and a booster in the battery-circuit; but my invention in its broader phase is not limited to this specific type of system. When, however, my invention is employed in this type of system, its object is to provide an efficient and economical system for regulating the output and input of the battery and booster circuit by automatically regulating the voltage of the booster and, if desired, the direction of said voltage in accordance with the requirements of the system.

My invention contemplates the employment, with the usual supply-conductors of a system of distribution, of a pair of electromotive-force generators, preferably, but not necessarily, dynamo-armatures. These electromotive-force generators are placed in other conductors than the supply-conductors and are in circuit with a source of electrical supply, preferably the usual supply-conductors. These electromotive-force generators are so constructed and connected to the system that given changes in the electrical condition of the system will produce definite alterations of the relative electrical conditions of the two electromotive-force generators. This I accomplish in the present invention by coils so connected as to be directly responsive to changes of current strength in one of the main conductors of the system, which coils may act through one or both of the electromotive-force generators. Specifically I prefer to place the coils in the circuit of the main generator and to use them as field-windings to influence the electromotive force generated by the armatures of the said electromotive-force generators. To obtain the most responsive effects, I arrange these field-windings so that increase of current in one of them will increase the electromotive force generated by its dynamo, while increase of current in the other winding decreases the electromotive force of its dynamo. The change in the relative electrical conditions of these two electromotive-force generators or dynamos effects definite variations in the electromotive force of a third generator, also preferably a dynamo, and this result is obtained by connecting the regulating-coil of the third generator, preferably the field-winding of a dynamo, in the circuit between the first two electromotive-force generators and the source of supply to which they are connected, whereby the connection to the source of supply is made through the field-winding of the third dynamo, and preferably at a point intermediate its ends, so that current flowing from the source of supply to the two dynamos will divide through said field-winding, and current generated by either of said dynamos will traverse said field-winding, the direction being dependent upon which of the two dynamos is temporarily acting as a generator. The third dynamo may be either an exciter for the booster or the booster itself, or, if not, any dynamo whose voltage is to be regulated in accordance with fluctuations in the electrical condition of the system.

Hereinafter when I refer to "regulating-dynamos" or "electromotive-force generators" I mean the two generators connected as above described to be differently affected by changes of electrical condition of the system, and where I refer to the "regulated dynamo" I mean the dynamo as above described whose field-winding is in circuit with the armatures of the regulating-dynamos.

The diagram of the drawing accompanying this specification is a diagram representing a system embodying the features of my present invention.

A represents a main dynamo or group of dynamos delivering energy to a working circuit containing translating devices, such as the trolley-cars W.

G is a storage battery in series with the armature E of a booster, the circuit containing this battery and booster-armature being connected to the generator A by conductors 6 and 7. The battery-circuit and the main generator are, as shown, in parallel with each other with reference to the load W.

4 is a motor of any suitable character driving the booster-armature E.

B and D are the armatures of the regulating-dynamos before referred to.

C is the armature of an exciter for the booster, and therefore is electrically connected directly with the field-winding V of the booster. In the specific case shown this exciter is the regulated dynamo before referred to, although it is obvious that the booster E is also a regulated dynamo, because its electromotive force varies directly with that of the exciter C.

T T' are field-coils for the regulated dynamo C, and these coils are connected to one side of the system through the switch U, which switch simply affords a means for manually adjusting the regulating apparatus. These coils T and T' are connected between the armatures B and D, the other poles of the armatures being connected to the opposite side of the circuit. It is obvious that any current received by armatures B and D from the system must pass through coils T and T' and that if armatures B and D are in the same electrical condition—that is, generating the same electromotive force—the current taken from the system will divide between such armatures and flow in one direction through coil T and in the other direction through coil T', thus being without any new result on armature C if the switch U is so adjusted that the current enters at the center of coils T T'. Under these circumstances both of the regulating-generators would be acting as motors, and the exciter C, and therefore the booster E, would be giving no electromotive force. The system will be adjusted so that with the desired average current on generator A this condition will be present.

Q and S are field-windings for B and D, respectively, which field-windings are placed in the conductor leading from the generator A to the battery-circuit. The effect of these windings may be adjusted by switches O and O' in a manner that will be well understood. It would be noted that these coils Q and S are indicated as having opposite effects upon their respective generators. Thus, let us assume that an increase in Q will increase the electromotive force of armature B. Then the same increase in winding S will decrease the electromotive force of armature D. P and R are shunt-coils on the said regulating-generators which give a certain fixed strength of field, preferably alike in each case, so that the windings Q and S may have their opposing effects upon the two dynamos.

F and F' are adjustable resistances for the circuits of coils P and R, thus affording an additional means for adjusting the regulating effects of the apparatus.

Assume that the exact average load is on the generator A and the two armatures B and D are producing the same electromotive force, so that both are armatures of motors. Then current is being received from the system to revolve them as motors, which current is equally dividing between coils T and T', so that no voltage is being generated by armature C or armature E. Assume now that the current on generator A increases, to whatever cause it may be due. Immediately the electromotive force of armature B is increased, while that of armature D is correspondingly decreased. Evidently the current will no longer divide equally between coils T and T', but a greater current will pass through coil T' than through coil T, so that an electromotive force will be produced by the regulated dynamo, thus generating a current in the booster-field and producing an electromotive force in the booster-armature in the same direction as that of the battery. A still further increase of the current in the circuit of generator A still further differentiates the electrical conditions of B and D and increases the electromotive force of the regulated dynamo and of the booster. In fact, if desired, the system can be so arranged that upon a certain increase of current the armature B will have so increased in electromotive force and the armature D so decreased in electromotive force that no current whatever will be supplied from the line, but the entire current in the electrical circuit will be generated in that circuit and be effective to produce electromotive force in the regulated dynamo. Conversely, a decrease in current below the normal will decrease the electromotive force of B and increase the electromotive force of D, thus causing the electromotive force of the regulated dynamo to be in the other direction and permit the booster to assist the generator voltage in charging the battery.

Preferably the armatures of the two regulating-dynamos and the armature of the regulated dynamo are mechanically connected on the same shaft. In some cases the shaft containing these three dynamos may be appropriately connected with an ordinary electric motor, so that there will always be sufficient motive power, while with certain adjustments or arrangements of the system there will always be sufficient motive power in one or more of the regulated or regulating dynamos to rotate the three at suitable speed.

It will be understood that my invention in its broader phase is not limited to the particular features I have set out, and I might specially refer to the fact that the system may well be operated with the electromotive force of only one of the two regulating-dynamos affected by fluctuations of load on the main generator. Moreover, I do not limit myself to the placing of the coils Q and S, or either of them, in the particular circuit shown, though I prefer to regulate by fluctuations of the generator load.

Having thus described my invention, what I claim, and desire to protect by Letters Patent, is—

1. In an electrical system, a conductor in a circuit subject to current fluctuations, a pair of electromotive-force generators placed in other conductors and connected to a source of electrical supply, a regulating-coil for one of said generators receiving said current fluctuations, a third electromotive-force generator, and controlling-coils therefor in the circuits of the aforesaid electromotive-force generators.

2. In an electrical system, a conductor in a circuit subject to current fluctuations, a pair of dynamos placed in other conductors and connected to a source of electrical supply, a field-winding for one of said dynamos receiving said current fluctuations, a third dynamo, and a field-winding therefor in the circuits of the aforesaid dynamos.

3. In an electrical system, a conductor of a circuit subject to current fluctuations, a pair of electromotive-force generators placed in other conductors connected to a source of electrical supply, regulating-coils for said generators receiving said current fluctuations and oppositely affecting said generators, a third electromotive-force generator, and controlling-coils therefor in the circuits of said pair of electromotive-force generators.

4. In an electrical system, a conductor of a circuit subject to current fluctuations, a pair of electromotive-force generators placed in other conductors connected to a source of electrical supply, regulating-coils for said generators receiving said current fluctuations and oppositely affecting said generators, a third dynamo, and controlling-coils therefor in the circuits of said pair of dynamos.

5. In an electrical system, a conductor of a circuit subject to current fluctuations, a pair of dynamos placed in other conductors connected to a source of electrical supply, field-windings for said dynamos receiving said current fluctuations and oppositely affecting said dynamos, a third dynamo, and controlling-coils therefor in the circuits of said pair of dynamos.

6. In an electrical system, a main generator, a storage battery in a branch circuit, a working circuit connected so that it may receive current from both the main generator and the battery-circuit, a pair of dynamos in a local circuit connected to a source of electrical supply, a field-winding for one of said dynamos located in the circuit of the main generator, a third dynamo for affecting the voltage of the battery-circuit, and a field-winding therefor in said local circuit.

7. In an electrical system, a main generator, a storage battery in a branch circuit, a working circuit connected so that it may receive current from both the main generator and the battery-circuit, a pair of dynamos in a local circuit connected to a source of electrical supply, field-windings for the said dynamos both located in the circuit of the main generator and oppositely affecting their respective dynamos, a dynamo for affecting the voltage of the battery-circuit, and a field-winding therefor in the said local circuit.

8. In a regulating apparatus two dynamos having field-coils connected in the same circuit but oppositely affecting their respective dynamos, in combination with a third dynamo whose electromotive force is dependent upon the difference in the electrical conditions of said two dynamos.

9. In a regulating apparatus two dynamos having field-coils connected in the same circuit but oppositely affecting their respective dynamos, in combination with a third dynamo and a field-winding therefor in the circuit of the armatures of said two dynamos.

10. In a regulating apparatus two dynamos having field-coils similarly affecting their respective dynamos and other field-coils in series with each other but oppositely affecting their respective dynamos, and a third dynamo whose electromotive force is dependent upon the difference in the electrical conditions of said two dynamos.

11. In a regulating apparatus two dynamos having field-coils similarly affecting their respective dynamos and other field-coils in series with each other but oppositely affecting their respective dynamos, and a third dynamo and a field-winding therefor in the circuit of the armatures of said two dynamos.

12. In an electrical system, a main generator, a storage battery in a branch circuit, a working circuit connected so that it may receive current from both the main generator and the battery-circuit, a pair of dynamos in another branch circuit, field-windings for said dynamos in other branch circuits, other field-windings for said dynamos in the generator-circuit arranged to oppositely affect their respective dynamos, a dynamo for affecting the voltage of the battery-circuit, and a field-winding therefor in the branch circuit with the armature of said dynamos.

In testimony whereof I have signed my name to this specification in the presence of two subscribing witnesses.

ALBERT S. HUBBARD.

Witnesses:
 EDWIN SEGER,
 JOHN O. GEMPLER.